Nov. 22, 1938.   O. C. GILMORE   2,137,570
CAMERA ATTACHMENT
Filed Jan. 25, 1936   2 Sheets-Sheet 1
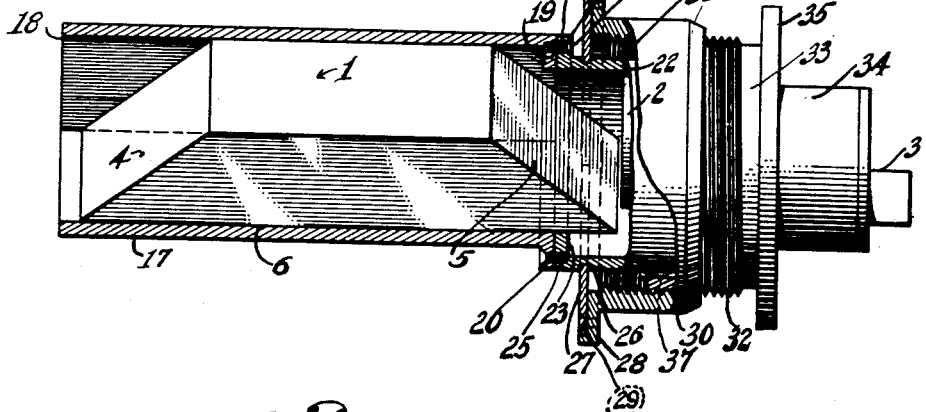
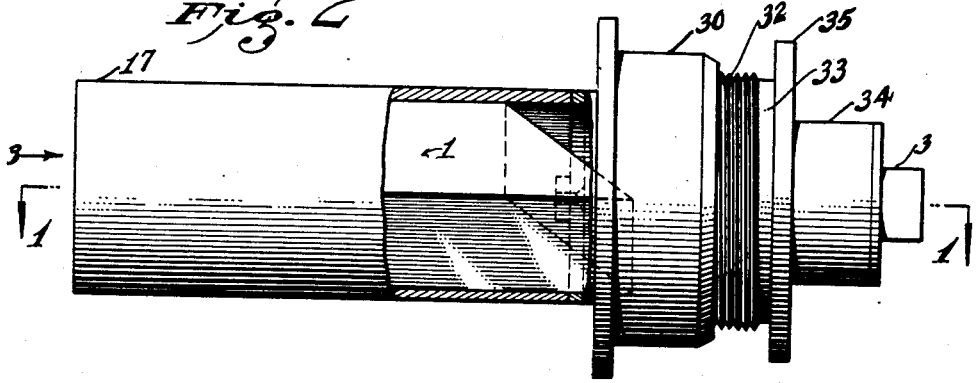
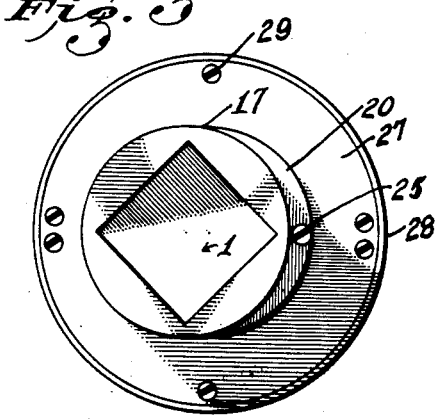
INVENTOR,
OTTO C. GILMORE.
BY Calvin Brown
ATTORNEY

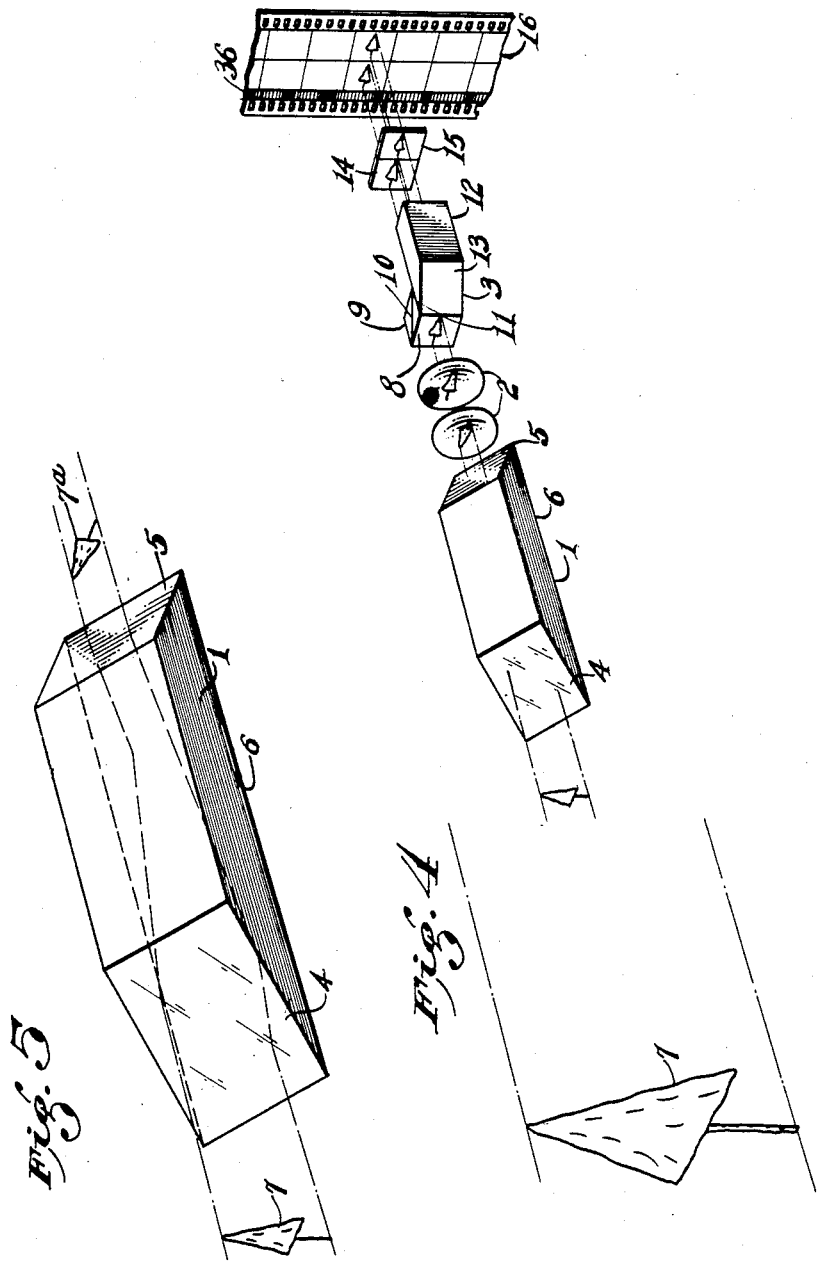

Patented Nov. 22, 1938

2,137,570

UNITED STATES PATENT OFFICE 2,137,570

CAMERA ATTACHMENT

Otto C. Gilmore, Van Nuys, Calif., assignor, by mesne assignments, to Cosmocolor Corporation, New York, N. Y., a corporation of Delaware Application January 25, 1936, Serial No. 60,776

5 Claims. (Cl. 88—16.4)

This invention is of that character wherein more than one image may be photographed on a film.

The invention is particularly adaptable when it is desired to photograph on a film a plurality of identical images of a given object, or subject, the photographic images being arranged on said film in certain defined relationship.

The invention finds adaptability particularly in cameras for color photography.

An object of the invention is the provision of suitable means adapted to act in conjunction with a camera whether of the still or motion picture type, and wherein a light pencil is divided into two or more paths bearing identical images of substantially the same light intensity and in such a manner that loss of light is reduced to a minimum.

Another object of the invention is the provision of a device which may be attached to cameras for the purpose of converting an ordinary type camera into a camera which may produce color records on a negative.

Another object is the provision of a device which is capable of producing color records and which device may form an integral part of or an attachment for a camera, the said device being both compact and small.

Another object is the provision of a device for the purpose stated which does not require mechanical change in the camera construction but wherein the said device of the invention may be substituted for the lens of the camera.

In the case of motion picture cameras, the device is readily adaptable to the same and said device is so constructed and the parts so arranged that no interference is experienced in operating the camera nor must the several component parts of the camera be changed, such as the view finder, the mat box, nor arrangement for the sound track.

More particularly, the component elements of the device are so arranged as to have the majority thereof in the optical axis of the lens.

Another object is the provision of a device adapted to turn an image and wherein light loss is reduced to a minimum.

With respect to the last object, it may be said that turning prisms are generally employed for the purpose of rotating an image to a given position. The use of prisms entails loss of light and if several prisms are used, the light loss may be so high as to render the device of little commercial use.

With the above and other objects in view, including simplicity of structure, ease of manufacture, and general efficiency, the invention consists in the novel and useful provision, formation, construction, association, and interrelation of parts, members and features, all as shown in a certain embodiment in the accompanying drawings, described generally, and more particularly pointed out in the claims.

In the drawings:

Figure 1 is a fragmentary sectional view on the line 1—1 of Figure 2,

Figure 2 is a side elevation, partly in section, of the invention,

Figure 3 is an end elevation looking in the direction of the arrow 3 of Figure 2, Figure 4 is a schematic view, the several component portions of the invention being separated and illustrating the manner in which an object is photographed upon a film in a defined manner, and, Figure 5 is a perspective view of an element of the invention.

Referring now to the drawings, reference is had to Figure 4 wherein the several elements of the invention are shown and these elements include a prism 1, a lens set 2, and a dividing prism set designated generally as 3. The prism 1 is a truncated, right-angle isosceles prism having refractive faces 4 and 5 and a reflecting face 6. The prism is truncated for the purpose of reducing the prism size, rendering the device more compact and eliminating unnecessary glass which might, in a measure, act to absorb light and thereby reduce its brilliancy. The refractive face 4 acts in the present instance as the light beam incident face, and the refractive face 5 is the light beam emergent face.

Considering an object, such as shown at 7, the light pencil strikes the incident beam face 4, is reflected by the face 6 outwardly through the emergent beam face 5. The dotted lines in Figure 5 indicate the path of light rays through the prism. A prism of this character inverts an image, that is to say, the image of the object is rotated 180° in the plane of the light pencil. However, for purposes of this invention, I desire that the image of the object be turned transversely. To accomplish this transverse turning of the image, I position the prism so that the base thereof is substantially at a 45° angle to a vertical plane paralleling and passed through the axis of the light pencil. Again observing Figure 5, it will be noted that the image 7a of the object 7 has been inverted and transversely turned.

The lens set 2 is so arranged that the axis thereof lies in the axis of the light pencil.

The prism set 3 is of that type which is generally used for the purpose of splitting the path of light and in this connection includes two right-angle isosceles prisms 8 and 9, the bases of which are in juxta-position, as indicated at 10. Adjacent one face 11 of one of the prisms 8 is a prism 12. This prism is in the form of a combined right angle prism and a right prism, the face 13 functioning to reflect the light path in a given direction. The surfaces of the bases of the prisms 8 and 9 may be slightly silvered so that certain of the light may be passed directly through both prisms 8 and 9 and a part be reflected through the prism 12. At 14 and 15, I have provided color filters which may have certain color characteristics; for instance, one filter may be blue and the other red, or blue-green and the other orange-red. The image bearing light pencils, after passage through said filters, form side-by-side photographic images upon a film 16, and these photographic images are identical as to size and character, save and except as influenced by the color filters.

Referring now to Figures 1 to 3, I have shown a suitable arrangement whereby the elements of the invention just described may be encased to render the same commercially useful. The prism 1 is mounted within a prism tube 17, this tube being open at one end 18, and the opposite end of the tube 19 is externally and internally provided with crescent shaped flanges 20 and 21, respectively. The lens set or assembly 2 is mounted within a lens tube 22, which tube carries at one end internally and externally crescent flanges 23 and 24, respectively, adapted to match the flanges 20 and 21, and be secured together by screws, designated generally as 25. The lens tube is provided with an annular groove 26 and fitted in part within said groove is a ring or annular disk 27, secured to a flange 28, by any suitable means 29, of a focusing collar 30. This focusing collar is internally provided with threads 31, the threads of which are in engagement with threads 32 of an adapter. This adapter includes two members 33 and 34 of different diameter and an interposed flange 35. The tubes 33 and 34 house the prism set 3. The flange 35 is generally provided with transverse bores through which screws are adapted to be passed for the purpose of holding the flange to the camera, the regular lens of the camera being removed. Obviously, the adapter is so constructed that it may be interchangeable with the lens of a standard motion picture camera. The prism 1, lens set 2 and image dividing prisms are maintained against rotation through the medium of a key 37 interposed between the lens tube 22 and the tube 33.

The operation, uses and advantages of the invention are as follows:

Assuming that the adapter has been fastened to that portion of the camera ordinarily carrying the lens, the lens of my device may be readily focused by turning the focusing collar. The prism 1 and the prism set 3 do not, of course, in any wise affect focusing. The filters, if the device is to be used for additive or subtractive color photography, are interposed in the camera adjacent the film, the closer to the film the better the results. It is to be noted that the prism tube 17 is slightly eccentric to the tube 34. This eccentricity is mechanically effected by the crescent shaped flanges, and eccentricity is essential if a sound track is to appear on the film, as indicated at 36.

It will be noted that the present device is saving in light, one reason being that a single reflecting surface is used for the prism 1 for turning the image, with the result that maximum illumination and minimum light absorption is effected. The prism set at 3 which divides the image is not found to materially reduce the illumination. Hence, the photographic images upon the film are sharp, clear and detailed.

I claim:

1. An attachment for converting an ordinary motion picture camera into a camera for taking color pictures that comprises a tube adapted to replace the lens tube of the camera, an erecting rhomboid prism at the outer end of said tube disposed so as to rotate the light pencil passing into the tube through an angle of approximately 90°, an objective within the tube, a light dividing prism system also within the tube, for receiving light from the objective and splitting the light into two like images, said tube comprising two movably articulated sections one holding the turning prism and the objective and the other holding the splitting prism set, and means for moving one of said sections axially with respect to the other to focus the objective.

2. An attachment for converting an ordinary motion picture camera into a camera for taking color pictures that comprises a tube adapted to replace the lens tube of the camera, an erecting rhomboid prism at the outer end of said tube disposed so as to rotate the light pencil passing into the tube through an angle of approximately 90°, an objective within the tube, a light splitting prism system also within the tube, for receiving light from the objective and splitting the light into two like images, said tube comprising two movably articulated sections one holding the turning prism and the objective and the other holding the splitting prism set, and means for moving one of said sections axially with respect to the other that includes a focusing collar threadedly mounted on one of said sections and means connecting the focusing collar and the other section so that axial movement of the focusing collar will produce a corresponding axial movement of that section.

3. An attachment for converting an ordinary motion picture camera into a camera for taking color pictures that comprises a tube adapted to replace the lens tube of the camera, an erecting rhomboid prism at the outer end of said tube disposed so as to rotate the light pencil passing into the tube through an angle of approximately 90°, an objective within the tube, a light splitting prism system also within the tube, for receiving light from the objective and splitting the light into two like images, said tube comprising three sections, one holding the erecting rhomboid prism, one holding the objective, and one holding the light dividing prism system, and means for moving the two sections supporting the objective and the light dividing prism with respect to each other.

4. An attachment for converting an ordinary motion picture camera into a camera for taking color pictures that comprises a tube adapted to replace the lens tube of the camera, an erecting rhomboid prism at the outer end of said tube disposed so as to rotate the light pencil passing into the tube through an angle of approximately 90°, an objective within the tube, a light dividing prism system also within the tube, for receiving light from the objective and splitting the light into two like images, said tube comprising two movably articulated sections one holding the turning prism and the objective and the other holding the splitting prism set, means for moving one of said sections axially with respect to the other and a key for preventing rotation of one section relative to the other.

5. An attachment for converting an ordinary motion picture camera into a camera for taking color pictures that comprises a tube adapted to replace the lens tube of the camera, an erecting rhomboid prism at the outer end of said tube disposed so as to rotate the light pencil passing into the tube through an angle of approximately 90°, an objective within the tube, a light dividing system also within the tube, for receiving light from the objective and splitting the light into two like images, said tube comprising two movably articulated sections one holding the turning prism and the objective and the other holding the light dividing prism set, and means for moving one of said sections axially with respect to the other, the tube section that holds the turning prism consisting of two tubular parts, one part movably articulated to the other section of the tube and being axially aligned therewith and the second part carrying the turning prism and being rigidly mounted on said first part in a position slightly out of axial alignment, and means to mount the objective slightly out of axial alignment with its tube section so as to be in alignment with the turning prism and the incident face of the light dividing prism set.

OTTO C. GILMORE.

CERTIFICATE OF CORRECTION.

Patent No. 2,137,570.  November 22, 1938.

OTTO C. GILMORE.

It is hereby certified that error appears in the printed specification of the above numbered patent requiring correction as follows: Page 2, second column, lines 58 to 64 inclusive, claim 3, strike out the words "three sections, one holding the erecting rhomboid prism, one holding the objective, and one holding the light dividing prism system, and means for moving the two sections supporting the objective and the light dividing prism with respect to each other" and insert instead two movably articulated sections one holding the turning prism and the objective and the other holding the splitting prism set, means for moving one of said sections axially with respect to the other and means for preventing rotation of one section relative to the other; page 3, first column, lines 1 to 6 inclusive, claim 4, strike out "two movably articulated sections one holding the turning prism and the objective and the other holding the splitting prism set, means for moving one of said sections axially with respect to the other and a key for preventing rotation of one section relative to the other" and insert instead three sections, one holding the erecting rhomboid prism, one holding the objective, and one holding the light dividing prism system, and means for moving the two sections supporting the objective and the light dividing prism with respect to each other; and that the said Letters Patent should be read with this correction therein that the same may conform to the record of the case in the Patent Office.

Signed and sealed this 10th day of January, A. D. 1939.

(Seal)

Henry Van Arsdale
Acting Commissioner of Patents.